United States Patent [19]

Eminger

[11] Patent Number: 5,235,738
[45] Date of Patent: Aug. 17, 1993

[54] APPARATUS FOR END TURN SHAPING

[75] Inventor: Robert J. Eminger, Ft. Wayne, Ind.

[73] Assignee: Pease Windamatic Systems, Inc., Fort Wayne, Ind.

[21] Appl. No.: 893,117

[22] Filed: Jun. 3, 1992

Related U.S. Application Data

[63] Continuation of Ser. No. 716,096, Jun. 17, 1991, abandoned.

[51] Int. Cl.$^5$ .............................................. H02K 15/06
[52] U.S. Cl. ....................................... 29/736; 29/596; 72/353.4; 72/383
[58] Field of Search ................. 29/596, 598, 606, 736, 29/564.1; 72/353, 355, 392, 383, 353.4

[56] References Cited

U.S. PATENT DOCUMENTS 3,913,373 10/1975 Kindig ............................. 29/596 X
5,056,212 10/1991 Scherer .............................. 29/736 X Primary Examiner—Carl E. Hall
Attorney, Agent, or Firm—Pearne, Gordon, McCoy & Granger

[57] ABSTRACT

A method and apparatus for shaping the winding end turns of a stator assembly wherein the outside diameter of the end turns is first engaged by a set of alternate segments in a circular array and is thereafter engaged by a set of intervening segments of the array while the first set remains engaged. The motion and configuration of the segments avoids the risk of pinching a wire of the winding by eliminating relative circumferential closing movement between adjacent segments. The inside diameter of the end turns is shaped by an expandable mandrel assembly that includes interengaged shoes that have a sliding movement in expansion and contraction that also avoids the risk of pinching strands of the winding.

14 Claims, 7 Drawing Sheets

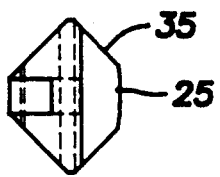
Fig. 7c
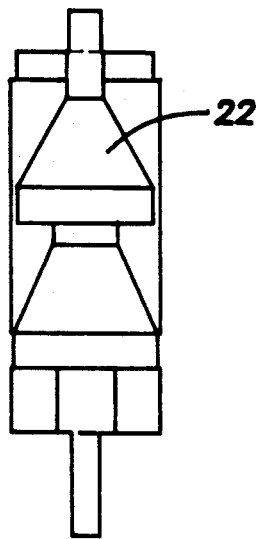
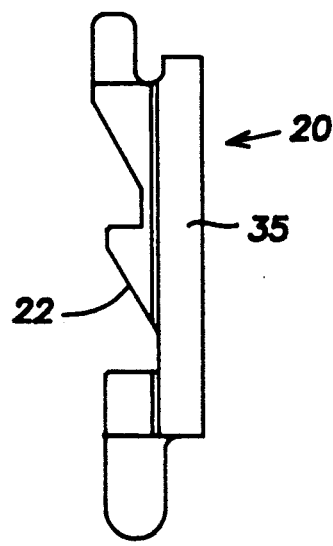
Fig. 7a    Fig. 7b
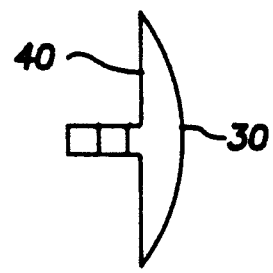
Fig. 8c
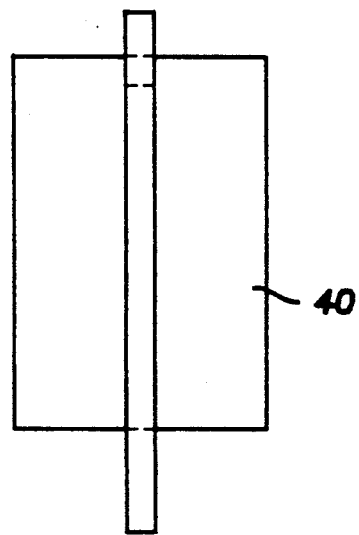
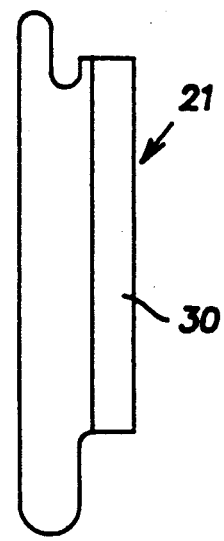
Fig. 8a    Fig. 8b

5,235,738

APPARATUS FOR END TURN SHAPING

This is a continuation of application Ser. No. 07/716,096, filed Jun. 17, 1991 now abandoned.

The invention relates to apparatus and a method for the manufacture of dynamoelectric machines, and more particularly, to the shaping of end turns of the windings of a stator assembly of such machines.

PRIOR ART

It is known, for example, from U.S. Pat. No. 4,051,595 to press the end turns of stator windings to a desired configuration. U.S. Pat. No. 4,449,289 illustrates a known type of actuating apparatus for shaping the outside diameter of the coil turns of a slotted stator core. Such apparatus includes a circular array of support fingers for the cuffs and carriers for such fingers. At FIGS. 6 and 7 of this latter patent, there is a circular cam ring that provides arcuate cam slots which, upon rotation of the ring, cause the fingers and associated carriers to move radially towards or from a working position. A potential problem with known types of coil outside diameter shaping apparatus is that there is a risk of pinching of the wire strands of the winding between the winding shaping elements when such elements converge radially towards their working positions. The pinching phenomena can occur because there are components of the closing motion of the shaping elements that are circumferential and that allow a wire to be squeezed circumferentially and thereby be damaged.

SUMMARY OF THE INVENTION

The invention provides apparatus for pressing or shaping the end turns of a coil winding assembled in slots of a stator core of a dynamoelectric machine. The apparatus has shoe elements for shaping the outside diameter of the end turn area that are configured and moved to respective working positions in a manner that avoids pinching of the wires. The shoe elements are arranged as segments in a circular array and are caused to extend or retract radially with respect to the center of the work station and stator assembly. In accordance with the invention, the shoe segments are caused to close radially into their working positions against the end turns at different times so that there is no effective circumferential component of closing motion between adjacent shoe segments in the immediate vicinity of their coil engaging work surfaces.

In the illustrated embodiment, the shoe segments are displaced by means of a multiple scroll cam. The cam scrolls are configured to advance alternate ones of the shoe segments to their respective working positions first and intervening ones of the shoe segments thereafter. The shoe segments arriving first to the working position typically have wedge-like configurations viewed along the central axis of the work station and the intervening shoe segments typically have bar-like configurations with parallel sides when similarly viewed along the central axis of the work station. Pairs of proximal alternate shoe segments provide parallel opposing surfaces between which an intervening shoe segment is closely guided. The side surfaces of the intervening shoe segments are parallel to the alternate shoe segment parallel opposing surfaces and closing movement of each intervening segment thereby occurs in a path parallel to these respective parallel opposing surfaces so that no wire pinching motion can occur between the adjacent shoe segments.

The invention also provides an expandable mandrel assembly for shaping the inside diameter of the stator windings. The expandable mandrel includes inner and outer shoes that expand and contract with a sliding contact arrangement that avoids the risk of pinching strands of the winding in both expanding and contracting movement.

BRIEF DESCRIPTION OF THE DRAWINGS

FIGS. 7a, 7b and 7c illustrate the inner face, side and plan views of a typical inner inside diameter shoe, respectively;

FIGS. 8a, 8b and 8c illustrate the inner face, side and plan views of a typical outer inside diameter shoe, respectively.

DESCRIPTION OF THE PREFERRED EMBODIMENT

Figure 1:
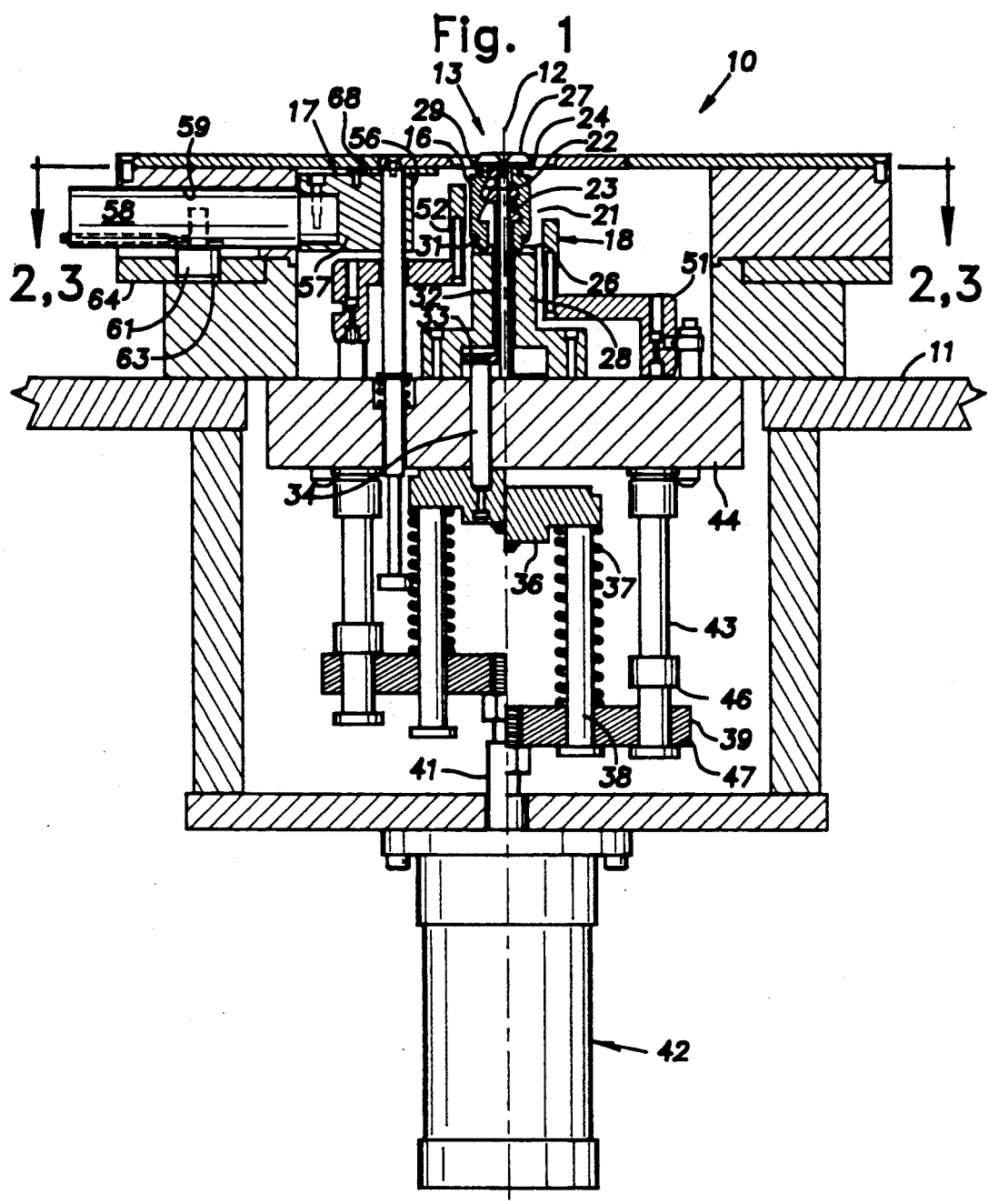
FIG. 1 is a somewhat schematic cross-sectional view of a form press, taken generally in a central vertical plane, for the end turns of a stator assembly constructed in accordance with the invention with the right-hand of the view showing the press in an open work receiving condition and the left-hand of the view showing the press in a partially closed working condition.

A machine or apparatus 10 for form pressing or shaping the end turns of a stator assembly of a dynamoelectric machine, typically an electric motor, includes a frame generally designated by the numeral 11. The numeral 12 designates an imaginary vertical axis of the machine 10 running through the center of a work station indicated generally at 13.

As will be understood from the discussion below, the form press or machine 10 has expandable tooling 16 to shape the inside diameter of the winding end turns of a stator assembly, contractible tooling 17 to shape the outside diameter of the winding end turns and compression ring tooling 18 to shape the end face of the winding end turns.

The inside diameter tooling 16 has the construction of an expandable mandrel. The expandable arbor or mandrel assembly 16 and an operating cam 23 are shown in detail in FIGS. 4 through 9. The mandrel or arbor assembly 16, sometimes referred to as the inside diameter (i.d. shoe assembly for shaping the inside diameter of a winding, includes a set of identical inner i.d. shoes 20 and a set of identical outer i.d. shoes 21. In the illustrated case, each of these shoe sets has a population of four. Each of the sets of shoes 20, 21 is symmetrically arranged about the axis 12 in a circular pattern defined by radial slots 24 and 26 in a shoe cap 27 and an annular base or bell support 28, respectively. The slots 24, 26 are equally spaced at angles of 45 degrees in the illustrated embodiment. As can be understood from FIGS. 4, 5, 6 and 9, the inner i.d. shoes 20 are directly engaged and driven radially outwardly by a central cam 23 through cam surfaces 22 engaged by the central cam. Movement of the inner i.d. shoes 20 is produced through the surfaces 22 by axial upward movement of the central cam 23 relative to the inner i.d. shoes.

Figure 6:
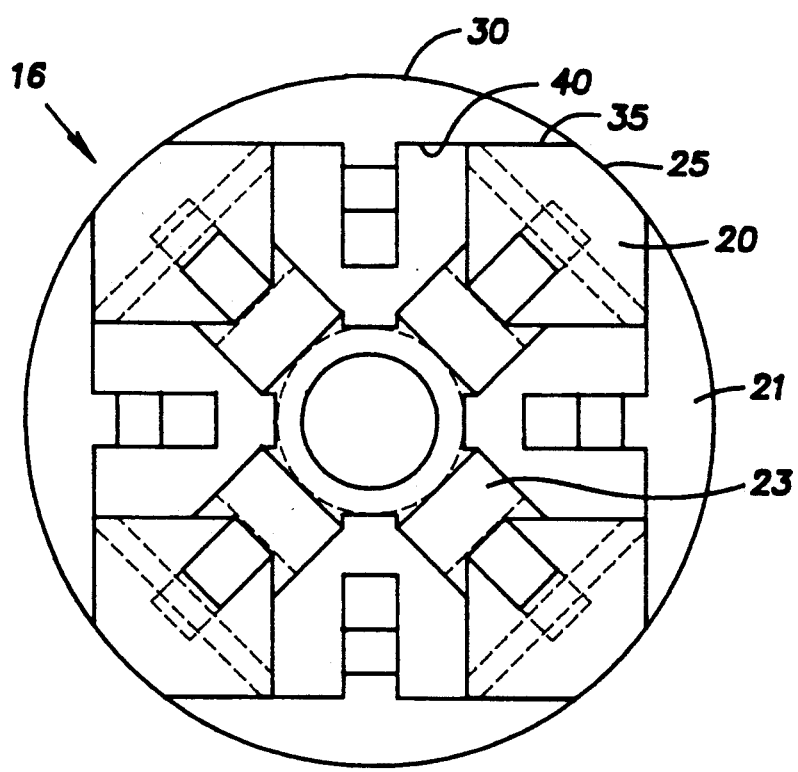
FIG. 6 is a somewhat schematic plan view similar to FIG. 5 showing the inside diameter shoe assembly in its expanded position.
Figure 9:
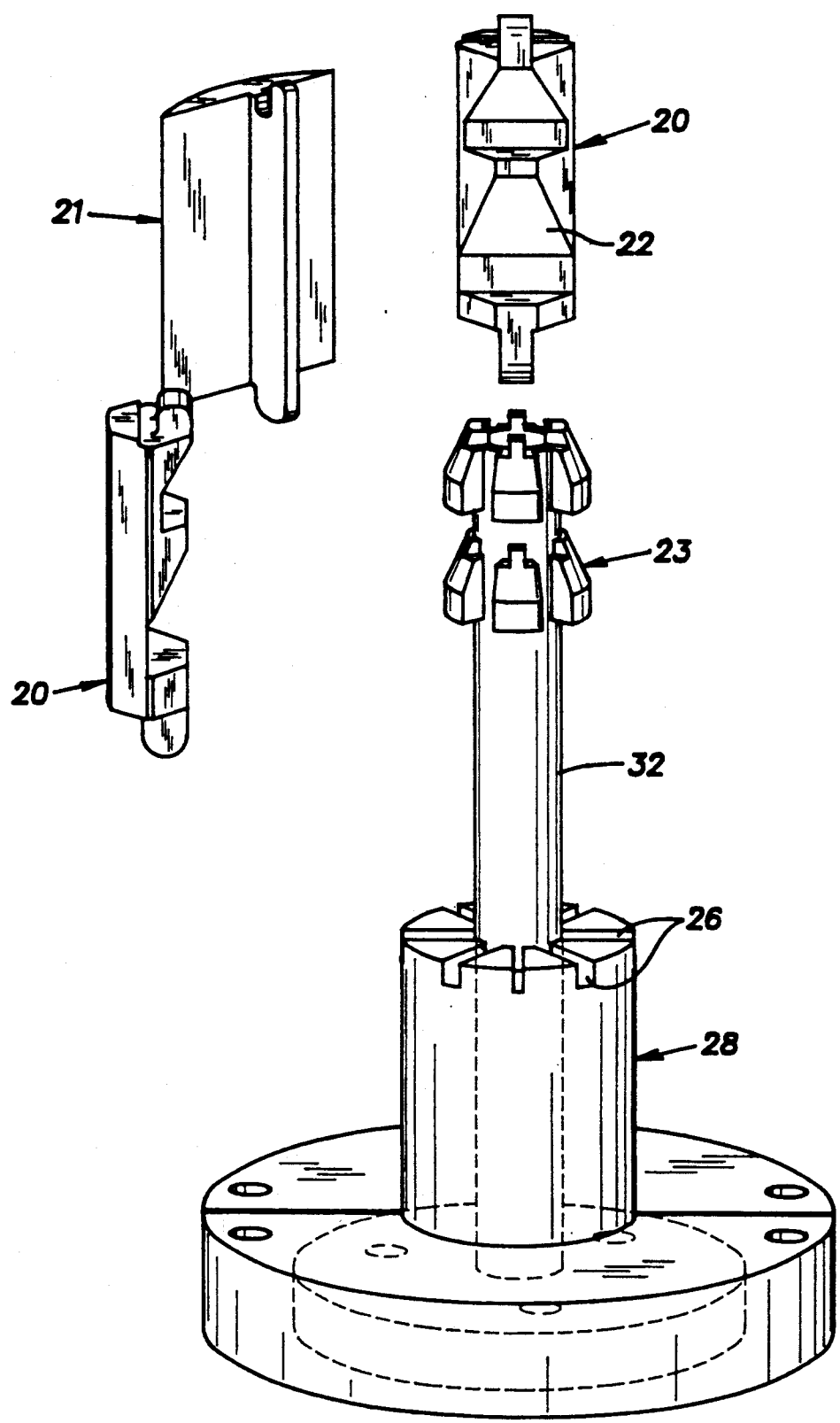
FIG. 9 is an exploded perspective view of portions of the shoe assembly, operating cam and base.

Vertical surfaces 25 and 30 of the inner and outer i.d. shoes 20 and 21, are cylindrical segments of equal radius that form a common cylindrical winding shaping surface when these elements are in their fully expanded positions of FIG. 6. Garter springs 29, 31, respectively, engage upper and lower portions of the inner and outer i.d. shoes 20 and 21 to resiliently bias and return these shoes to their contracted position. In contrast, the outer i.d. shoes 21 are driven radially outwardly by the inner i.d. shoes 20.

The central cam 23 includes a hollow cylindrical extension 32 and a radially extending annular flange 33 at the lower end of the extension. The cam extension 32 is moved vertically in a bore of the bell-shaped support 28. Rigid connecting rods 34 (only one of three symmetrically arranged rods is seen in FIG. 1) interconnect the cam flange 33 to a pressure plate 36. Compression springs 37 precompressed by tension rods 38 resiliently bias the pressure plate 36 away from a drive plate 39. The drive plate 39 is fixed to a rod 41 of a hydraulic actuating cylinder 42. Lower ends of lost motion connecting rods 43 are assembled in holes in the drive plate 39 and extend through clearance holes (not shown) in a main plate 44. Opposing shoulders 46, 47 on the lower end of the connecting rods 43 are on opposite sides of the drive plate 39 and are spaced a distance greater than the thickness of the plate to provide a degree of lost motion as discussed below.

Fixed to the upper ends of the lost motion connecting rods 43 by bolts is a compression ring base 51 that is an annular bell-shaped body that is concentrically assembled over the inner bell support 28. The compression ring base 51 includes an axially extending flange 52 at its inside diameter to which is fixed the compression ring 18 by suitable screws.

Figure 2:
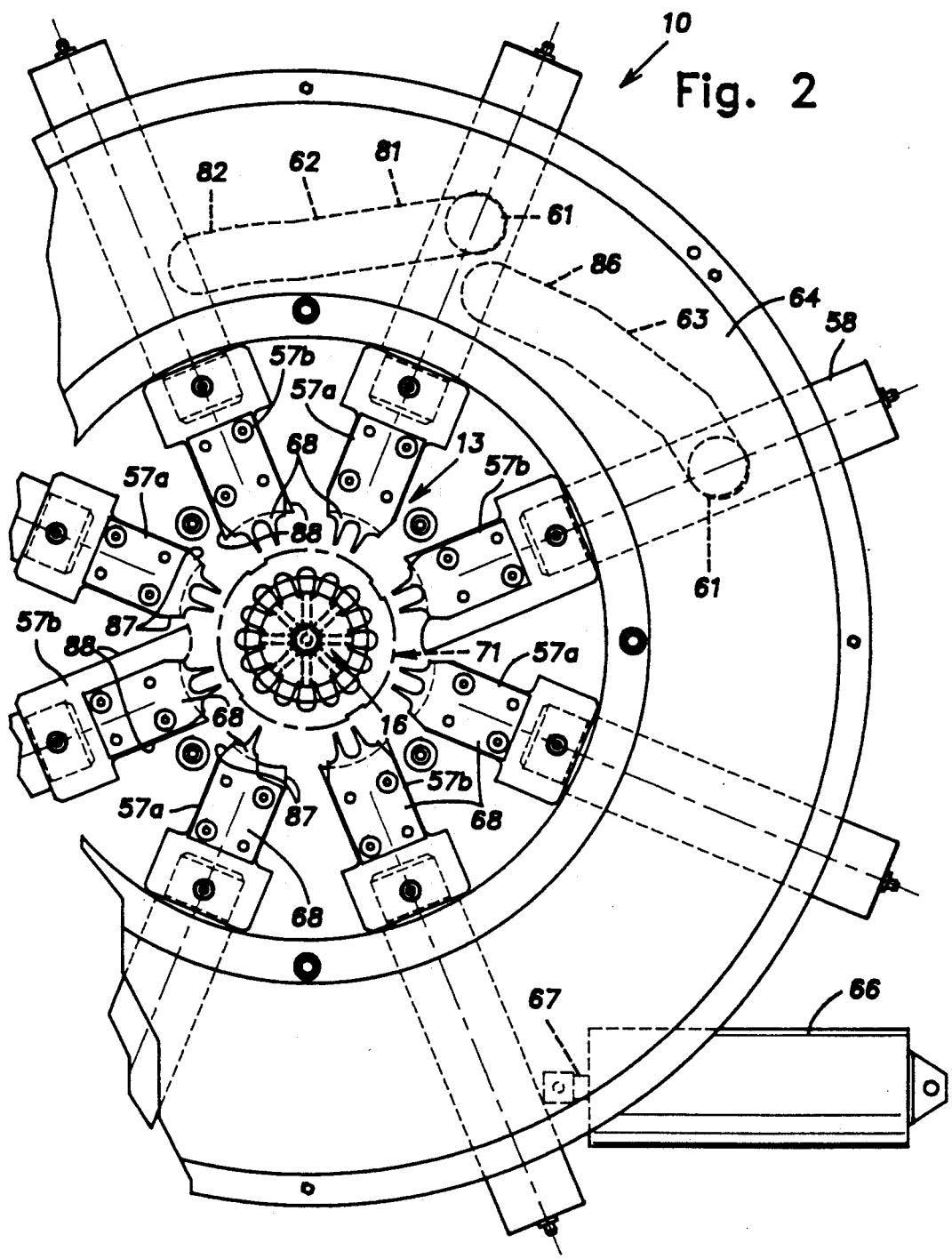
FIG. 2 is a somewhat schematic transverse view of the form press taken in the plane 2—2 indicated in FIG. 1.
Figure 3:
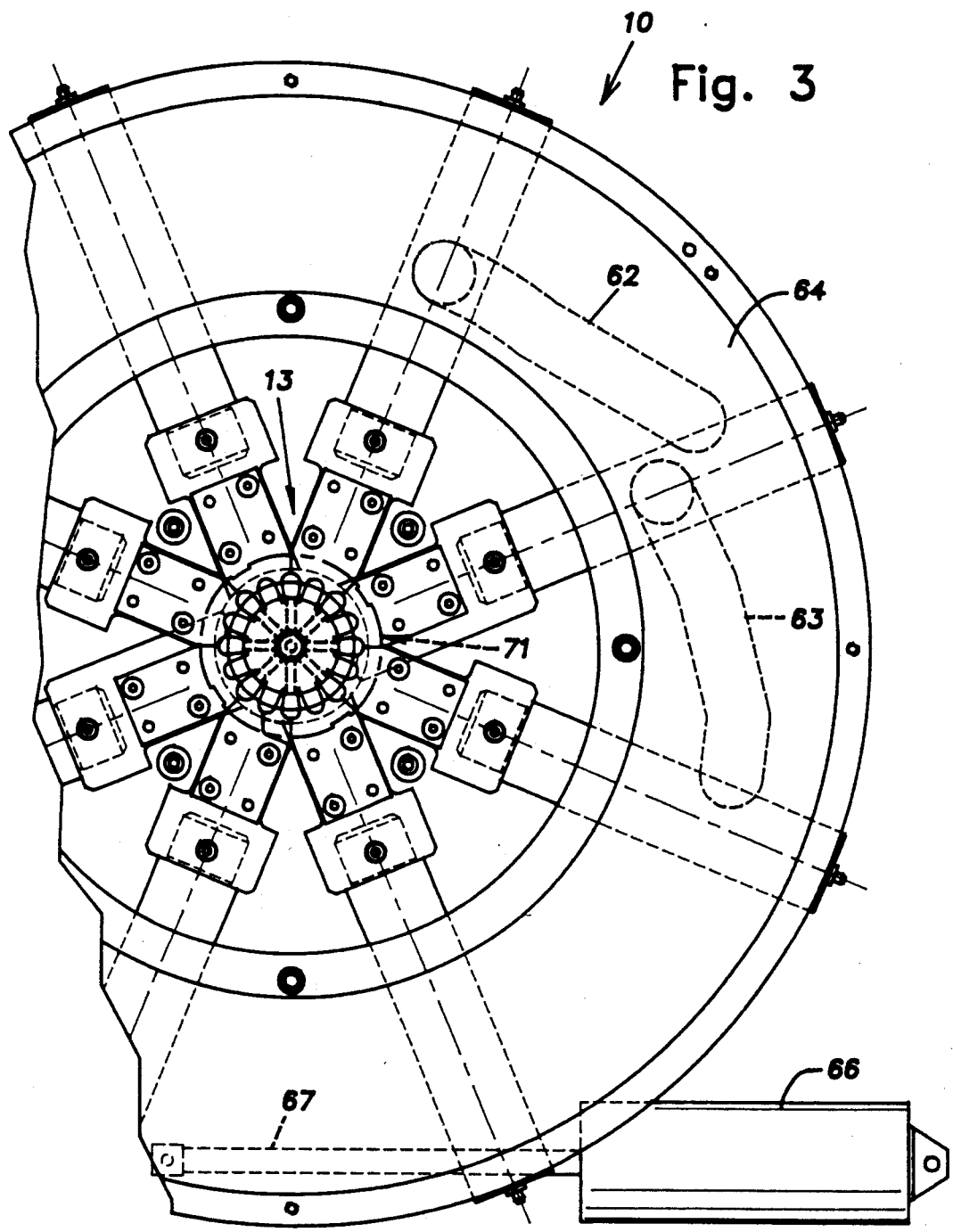
FIG. 3 is a view similar to FIG. 2 but illustrates the press in a closed or working position.
Figure 4:
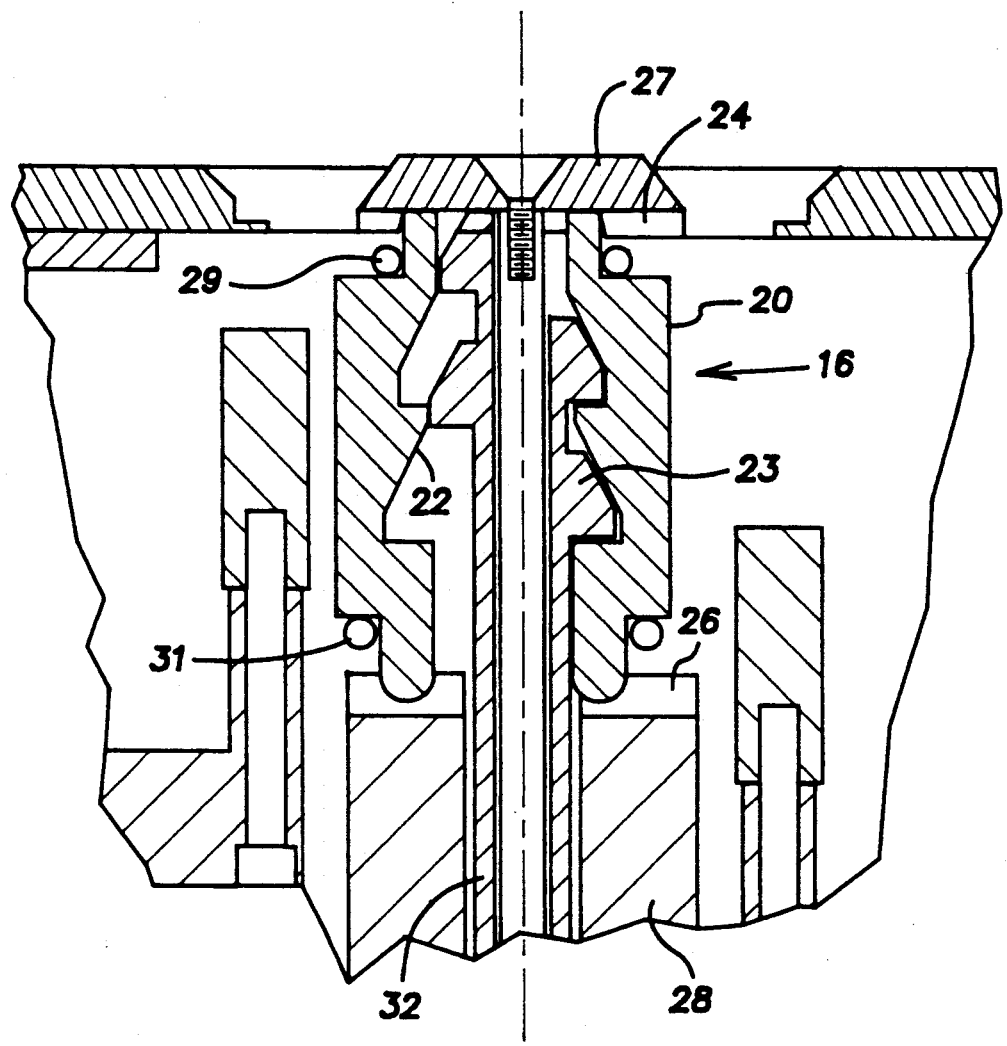
FIG. 4 is a somewhat schematic enlarged sectional view of an inside diameter expandable mandrel shoe assembly with the right side shown in a contracted position and the left side shown in an expanded position.
Figure 5:
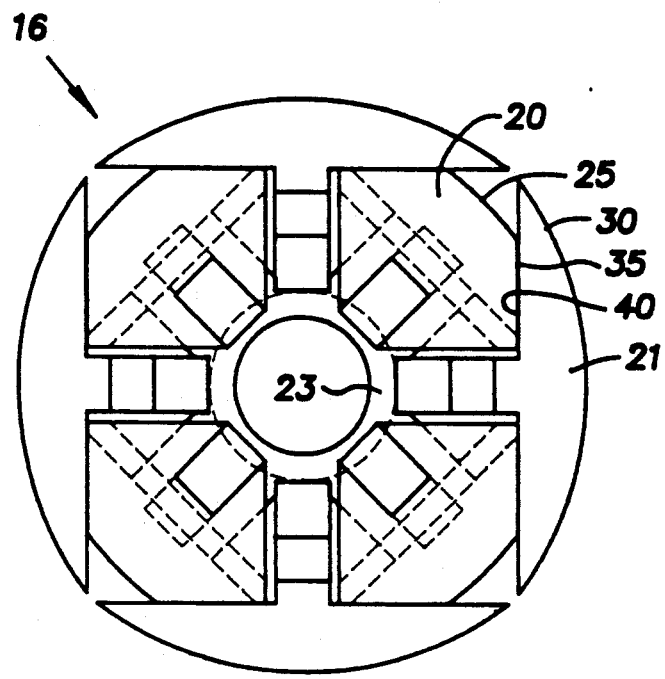
FIG. 5 is a somewhat schematic plan view of the inside diameter shoe assembly in the retracted position.

The outside diameter of the winding end turns of a stator assembly is shaped by cylindrical surfaces 56 of shoes or segments 57 arranged in a circular array concentric about the axis 12 and in a plane perpendicular to such axis. The shoes 57 are mounted on carrier bars 58 oriented radially with respect to the axis 12. The shoes 57 are fixed on the ends of the bars 58 by screws or other suitable means. The bars 58, carrying the shoes 57, are each slidably supported in a respective bore 59 that is fixed with respect to the frame 11 and is oriented radially with respect to the axis 12. At mid-length, each of the bars 58 has a cam follower 61 fixed to it. Each cam follower 61 depends into an individual scroll-like cam slot or surface 62 or 63 cut or otherwise formed in a circular cam plate 64. With reference to FIGS. 2 and 3, the scroll cam slots 62, 63, in the illustrated embodiment, have one of two configurations. For clarity, only one example of each configuration of a cam slot is shown in dotted lines in FIGS. 2 and 3, but it will be understood that each of the shoes 57 has an associated cam scroll or slot 62 or 63 associated with it (alternate slots are designated 62 and intervening slots are designated 63).

The circular cam plate or ring 64 is power-rotated through a limited angle by a hydraulic actuator 66 having its rod 67 tangentially oriented with respect to the periphery of the plate 64. A free end of the rod 67 is pivotally connected to the cam plate 64 and the end of the actuator 66 opposite the rod 67 is pivoted on the frame 11. Rotation of the cam plate 64, by energization of the hydraulic actuator 66 is converted by the scroll cam slots 62, 63 to radial movement of the contractible tooling shoes 57. Cuff support plates 68 are attached to the upper faces of the shoes or segments 57. As shown in FIGS. 2 and 3, the cuff supports 68 each have one or more fingers associated therewith to embrace the sides of respective ones of the cuffs.

In operation, a conventional stator assembly (diagrammatically indicated at 71 in FIGS. 2 and 3) comprising a stack of laminations having longitudinal slots distributed circumferentially around its bore and field windings of magnet wire assembled in the slots is positioned over the shoe cap 27 manually or by automatic means. The stator assembly 71 is angularly aligned so that the end turns and cuffs are registered with respective adjacent fingers of the cuff supports 68. The operation of the i.d. shoes 20, 21 can be understood by reference to FIGS. 4-6 and 9. Upward axial movement of the central cam 23 produced by extension of the actuator 42 is converted to radial outward movement of the inner i.d. shoes 20 by the associated cam surfaces 22 from the position illustrated at the right in FIG. 4 and in FIG. 5. Radially outward movement of the inner i.d. shoes 20, in turn, causes the outer i.d. shoes 21 to move radially outwardly. Motion of the outer i.d. shoes 21 results from sliding cam contact between abutting vertical flat surfaces 35, 40 of the inner and outer i.d. shoes 20, 21, respectively. These surfaces 35, 40 are in planes oblique to the radial line of motion of the inner i.d. shoes 20 and perpendicular to the line of motion of the outer i.d. shoes 21. The sliding or wiping contact between these surfaces 35, 40 during expansion of the i.d. shoe assembly or mandrel 16 does not present a condition likely to cause a strand of a winding to be pinched between moving surfaces. The shoes 20, 21, at the end of the up-stroke of the central cam 23 reach the position illustrated in FIG. 6 where a segmented full cylindrical surface is formed by the individual surfaces 25, 30 to fully shape the inside diameter of the windings. When the central cam 23 is retracted, upon reversal of the hydraulic actuator 42, the shoes 20, 21 are contracted or collapsed from the position of FIG. 6 to the position of FIG. 5. This motion is produced by radial forces applied by the garter springs 29, 31 encircling the top and bottom portions of the shoes 20 and 21. Contraction of the shoes 20 and 21 from the working position of FIG. 6 is characterized by a reversal of the sliding action between the flat surfaces 35, 40 and such movement avoids the risk of a strand of the winding being pinched by these relatively moving elements.

The circular cam plate 64 is rotated by the actuator 66 through extension of the rod 67 causing the cuff supports to engage the cuffs and support the same and causing cylindrical surfaces 56 of the shoes 57 to move radially into a working position corresponding to the finish outside diameter of the end turns. As previously suggested, FIG. 2 illustrates the cuff supports 68 and shoes 57 in their respective open positions while FIG. 3 illustrates the same in their closed working positions. Between these open and working positions, these elements move along respective radial paths corresponding to the axis of their associated carrier bars 58.

The manner in which the shoes 57 move radially inwardly to their work positions is unique to the invention and advantageously reduces the risk that a strand of magnet wire forming part of the field windings of the stator assembly 71 could be pinched between adjacent ones of the shoes 57. This is achieved by causing adjacent shoes to move to their respective working positions at different times in a cycle of operation of the cam plate 64. Motion of the individual shoes 57 is controlled by the cam slots 62 and 63. As can be seen in FIGS. 2 and 3, the slots 62 and 63 differ from one another. A first of these slots 62 has a section 81 that produces a relatively high rate of radial movement of the associated shoe 57a for a given angular displacement of the cam plate 64 and, additionally, has a dwell section 82 of measurable length that holds the associated shoe 57a inactive from radial movement while the cam plate is rotating. The dwell section 82 is concentric about the axis 12 and corresponds to the working position of the respective shoe 57a. The other slot 63 has a profile that produces a lagging motion, when the cam plate 64 is operated to close the shoes 57b with respect to the motion produced by the first slot 62. In particular, the slot 63 has a section 86 that produces the final closing action of its associated shoe 57b during the time period that the adjacent shoes 57a have already reached their respective working positions and are in the dwell sections 82. From this discussion, it will be understood that, ideally, alternate ones of the shoes 57a have associated therewith the first type of cam slot 62 and intervening ones of the shoes 57b have associated therewith the other type of cam slot 63. It will be further understood that the alternate shoes 57a reach their respective working positions first and while they dwell at these working positions, the intervening shoes 57b are finally moved into their respective working positions. Preferably, the alternate shoes 57a have their sidewall surfaces 87 adjacent their working ends on converging planes that correspond to a wedge-shape in plan view along the axis 12. In contrast, the intervening shoes 57b each have side surfaces 88 that are parallel to one another to provide a bar-like configuration in plan view along the axis 12. The shoes 57a and 57b are proportioned so that when they are in their fully closed or working positions, their surfaces 56 describe a common cylindrical surface for confining the outside diameter of the winding end turns. From the above discussion and inspection of FIG. 3, it can be seen that when the intervening shoes 57b are caused to move to the final work position with the alternate shoes 57a already at this position, there is no convergence or component of motion in a circumferential direction between adjacent shoes 57a and 57b which could potentially result in a pinched strand of wire.

The inside diameter of the end turns is formed by expansion of the tooling 16. This is accomplished by energizing the actuator 42 to cause the pressure plate to rise under the influence of the compression springs 37. Motion of the pressure plate 36 is transmitted to the connecting rods 34 to cause the central cam 23 to rise and expand the shoes 20. Motion of the pressure plate 36 is limited by contact with the main plate 44. Further extension of the rod 41 of the actuator 42 causes a forcible rise of the compression ring 18 through the lost motion rods 43. It will be noted that initial movement of the actuator rod 41 is not imparted to the compression ring 18 because of the lost motion gap between the drive or force plate 39 and the upper shoulders 46 on the lost motion connecting rods 43.

It should be evident that this disclosure is by way of example and that various changes may be made by adding, modifying or eliminating details without departing from the fair scope of the teaching contained in this disclosure. For example, the disclosed apparatus can be duplicated to provide upper and lower stations to press end turns at both ends of a stator assembly simultaneously. The invention is therefore not limited to particular details of this disclosure except to the extent that the following claims are necessarily so limited.

I claim:

1. Apparatus for shaping the winding end turns of a stator assembly comprising a work station for receiving a stator assembly with its axis in coincidence with an axis of a center of the work station, a circular array of shaping segments, means for supporting the segments for radial movement with respect to the axis of the stator assembly between retracted positions where they clear the end turns of the stator assembly received in the work station and operative positions where they are adapted to radially support the end turns, means for moving said segments between their respective retracted and operative positions, said moving means being constructed and arranged to move alternate ones of said segments into their operative positions in a first period and to move intervening ones of said segments to their operative positions in a second period that is completed subsequent to said first period whereby pinching of wires between adjacent segments is avoided, said moving means including cam surfaces associated with each segment, the cam surfaces of said alternate segments being different in contour than the cam surfaces of the intervening segments, wherein said alternate and intervening segments, when in the operative position, are generally spaced the same distance from the stator axis.

2. Apparatus as set forth in claim 1, wherein said cam surfaces are provided on a common circular plate, said cam plate being rotatable about said work station axis.

3. Apparatus as set forth in claim 1, including an expandable mandrel engageable with the bore of the stator assembly.

4. Apparatus as set forth in claim 3, including compression plate means for compressing the end turns axially towards the stator core of the stator assembly while said end turns are radially supported by said segments.

5. Apparatus as set forth in claim 1, wherein said alternate segments have a wedge-like configuration when viewed along said work station axis, said intervening segments each having a parallel bar configuration, when viewed along said work station axis, that closely fits the space between adjacent alternate segments when the latter are in their operative positions.

6. An expandable arbor for shaping the inside diameter of the stator windings of a dynamoelectric machine comprising an outer set of shoes arranged in a generally circular array, each of said outer set of shoes having an outer cylindrical surface with a common radius, an inner set of shoes arranged in a circular array concentric with and intervening the array of the first set, each of said inner set of shoes having an outer cylindrical surface of a radius substantially the same as said common radius of said outer set of shoes, means to move the inner shoes radially outwardly, said outer and inner shoes having interengaging surfaces arranged to produce radially outward movement of said outer shoes when said inner shoes are moved radially outwardly by said moving means, the configuration of said interengaging surfaces avoiding the risk of a strand of a winding being pinched therebetween.

7. An expandable arbor assembly asset forth in claim 6, wherein said interengaging surface means lie in flat plates.

8. An expandable arbor assembly as set forth in claim 7, wherein said flat plates are oblique to the line of motion of their respective inner shoe.

9. Apparatus for shaping the winding end turns of a stator assembly comprising a work station for receiving a stator assembly with its axis in coincidence with an axis of a center of the work station, a circular array of shaping segments, means for supporting the segments for radial inward movement with respect to the axis of the stator assembly between retracted positions where they clear the end turns of the stator assembly received in the work station and operative positions where they are adapted to radially support an exterior of the end turns, means for moving said segments between their respective retracted and operative positions, said moving means being constructed and arranged to move alternate ones of said segments into their operative positions in a first period and to move intervening ones of said segments to their operative positions in a second period that is completed subsequent to said first period whereby pinching of wires between adjacent segments is avoided.

10. Apparatus as set forth in claim 9, wherein said moving means includes cam surfaces associated with each segment, the cam surfaces of said alternate segments being different in contour than the cam surface of said intervening segments.

11. Apparatus as set forth in claim 10, wherein said cam surfaces are provided on a common circular plate, said cam plate being rotatable about said work station axis.

12. Apparatus as set forth in claim 9, including an expandable mandrel engageable with the bore of the stator assembly.

13. Apparatus as set forth in claim 12, including compression plate means for compressing the end turns axially towards the stator core of the stator assembly while said end turns are radially supported by said segments.

14. Apparatus as set forth in claim 9, wherein said alternate segments have a wedge-like configuration when viewed along said work station axis, said intervening segments each having a parallel bar configuration, when viewed along said work station axis, that closely fits the space between adjacent alternate segments when the latter are in their operative positions.

* * * * *